United States Patent
Osato et al.

(10) Patent No.: US 9,868,181 B2
(45) Date of Patent: Jan. 16, 2018

(54) ASSEMBLY EQUIPMENT AND ASSEMBLY METHOD

(71) Applicant: CANON KABUSHIKI KAISHA, Tokyo (JP)

(72) Inventors: Toshiaki Osato, Tokyo (JP); Takashi Arai, Saitama (JP); Shuichi Hirasawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 288 days.

(21) Appl. No.: 13/754,096

(22) Filed: Jan. 30, 2013

(65) Prior Publication Data

US 2013/0199010 A1   Aug. 8, 2013

(30) Foreign Application Priority Data

Feb. 3, 2012 (JP) ................. 2012-022075

(51) Int. Cl.
| | |
|---|---|
| B23P 19/04 | (2006.01) |
| B23P 21/00 | (2006.01) |
| B23Q 1/00 | (2006.01) |
| B25J 9/00 | (2006.01) |
| B25J 17/02 | (2006.01) |

(52) U.S. Cl.
CPC ............. B23Q 1/00 (2013.01); B23P 19/04 (2013.01); B25J 9/0084 (2013.01); B25J 9/0087 (2013.01); B25J 9/0096 (2013.01); B25J 17/025 (2013.01); *Y10T 29/53991* (2015.01)

(58) Field of Classification Search
CPC ........... B23P 19/00; B23P 19/04; B23P 21/00; B23P 23/00

USPC ..... 29/283, 281.1, 235, 282; 901/18, 31, 41; 414/735, 741; 74/490.01
See application file for complete search history.

(56) References Cited

U.S. PATENT DOCUMENTS

| | | | | |
|---|---|---|---|---|
| 4,275,986 A | * | 6/1981 | Engelberger et al. | ........ 414/730 |
| 4,828,453 A | * | 5/1989 | Martin et al. | ................. 414/738 |
| 6,047,472 A | * | 4/2000 | Koch et al. | ................ 29/888.01 |
| 2007/0169231 A1 | * | 7/2007 | Zhang et al. | ................... 901/31 |

(Continued)

FOREIGN PATENT DOCUMENTS

| | | |
|---|---|---|
| CN | 1925948 A | 3/2007 |
| EP | 0704780 A1 * | 3/1995 |

(Continued)

*Primary Examiner* — Joseph J Hail
*Assistant Examiner* — Jon Taylor
(74) *Attorney, Agent, or Firm* — Canon USA, Inc., IP Division

(57) ABSTRACT

Assembly equipment comprises a base, a first holding hand provided in a first robot arm set on the base, a second holding hand provided in a second robot arm set on the base, and a control device configured to control the first and second robot arms and the first and second holding hands. The first holding hand comprises an attachment connected to the first robot arm and having a rotation shaft, and an aligning holding mechanism provided in a rotation mechanism having a rotation shaft located to intersect the rotation shaft of the attachment or located in a skewed positional relationship with the rotation shaft of the attachment. A cooperative working area of the first and second holding hands is provided in an overlapping area where working areas of the first and second holding hands overlap with each other.

30 Claims, 6 Drawing Sheets

(56) References Cited

U.S. PATENT DOCUMENTS

| | | | |
|---|---|---|---|
| 2009/0320258 A1* | 12/2009 | Davidyan | 29/283 |
| 2011/0022228 A1* | 1/2011 | Mikurube et al. | 700/248 |
| 2011/0107866 A1 | 5/2011 | Oka | |
| 2011/0185556 A1* | 8/2011 | Hirano | B25J 9/0084 |
| | | | 29/428 |
| 2011/0219906 A1 | 9/2011 | Haniya | |

FOREIGN PATENT DOCUMENTS

| | | |
|---|---|---|
| EP | 0704780 A1 | 4/1996 |
| EP | 2353796 A2 * | 8/2011 |
| JP | H01-321185 A | 12/1989 |
| JP | 2000-117669 A | 4/2000 |
| JP | 2005-014104 A | 1/2005 |
| JP | 2007-185723 A | 7/2007 |
| JP | 2010-105106 A | 5/2010 |
| JP | 2010099755 A | 5/2010 |
| JP | 2011156647 A | 8/2011 |
| JP | 6039187 A | 12/2016 |
| WO | 2011/068227 A1 | 6/2011 |

* cited by examiner

ASSEMBLY EQUIPMENT AND ASSEMBLY METHOD

BACKGROUND OF THE INVENTION

Field of the Invention

Aspects of the present invention generally relate to assembly equipment that performs assembly operation with two robot arms having aligning holding hands.

Description of the Related Art

In industry, a number of pieces of assembly equipment that perform assembly operation using robot arms have been used. In recent years, there has been a demand for assembly equipment that achieves assembly operation using robot arms, instead of manually performing assembly operation. In contrast, in manual assembly performed in production factories, a human cell production system has been introduced in which conveyors are removed and a person directly conveys workpieces and assembles a plurality of kinds of parts and complementary materials to the workpieces.

There is a new cell production system called a "machine cell production system" that enhances productivity of an operator by combining manpower and assembly equipment.

From such a background, there is a demand for assembly equipment that can assemble a plurality of parts and complementary materials to a workpiece only in the assembly equipment in order to perform assembly using robot arms instead of manual assembly.

Japanese Patent Laid-Open No. 2010-105106 (hereinafter referred to as "Patent Document 1") proposes a production system that can assemble a plurality of parts and complementary materials to a workpiece to enhance working efficiency.

The production system of Patent Document 1 comprises a pair of manipulators equipped with hands for holding a part of an assembled part, an assembly stage serving as an assembly position for two parts, and a control device for operating the manipulators. The manipulators are arranged such that working areas of the hands overlap to form an overlapping working area. The assembly stage is provided in the overlapping working area.

However, the related art disclosed in Patent Document 1 has the following problems.

First, a number of detachment and conveying operations are sometimes performed during assembly.

It is necessary to perform a workpiece conveying and attaching operation of conveying a workpiece from a supply position to a predetermined position on the assembly stage by the robot arm and attaching the workpiece to the assembly stage and a workpiece removing and conveying operation of removing the workpiece from the assembly stage and conveying the workpiece to an eject position. Since assembly operation is performed with the workpiece being held on the assembly stage, working efficiency is reduced.

Further, it is necessary to hold, in the hands, tooling such as a coating device and a screwdriver and to attach and detach the tooling in response to a holding operation and a release operation. This also reduces working efficiency.

Secondly, a sufficient degree of freedom in assembly needed to an assembly operation, such as a coating operation, is sometimes not ensured. Since the operation is performed with the workpiece being fixed on the assembly stage, the posture of the workpiece is limited and this makes it difficult to perform assembly with a high degree of freedom. When the assembly stage is used, a fixing jig is frequently used in combination with the assembly stage, and this increases the production cost.

SUMMARY OF THE INVENTION

One aspect of the present invention provides assembly equipment that provides high working efficiency and is able to perform assembly operation with a high degree of freedom.

Assembly equipment according to an aspect of the present invention comprises a base, a first holding hand provided in a first robot arm set on the base, a second holding hand provided in a second robot arm set on the base, and a control device configured to control the first and second robot arms and the first and second holding hands. The first holding hand comprises an attachment connected to the first robot arm and having a rotation shaft, and an aligning holding mechanism provided in a rotation mechanism having a rotation shaft located to intersect the rotation shaft of the attachment or located in a skewed positional relationship with the rotation shaft of the attachment. A cooperative working area of the first and second holding hands is provided in an overlapping area where working areas of the first and second holding hands overlap with each other.

According to exemplary embodiments of the assembly equipment, a part can be conveyed to an assembly position where the part is to be assembled to a held workpiece, and assembly operation can be performed with the first and second holding hands provided in the robot arms without using an assembly stage. For this reason, it is possible to omit a workpiece conveying and attaching operation and a workpiece removing and conveying operation that should be performed when the assembly stage is used. Further, since the assembly position and posture of the workpiece can be arbitrarily changed, high productivity can be ensured and assembly can be performed with a high degree of freedom.

Further features of the present invention will become apparent from the following description of exemplary embodiments with reference to the attached drawings.

DESCRIPTION OF THE EMBODIMENTS

First Embodiment

Figure 1:
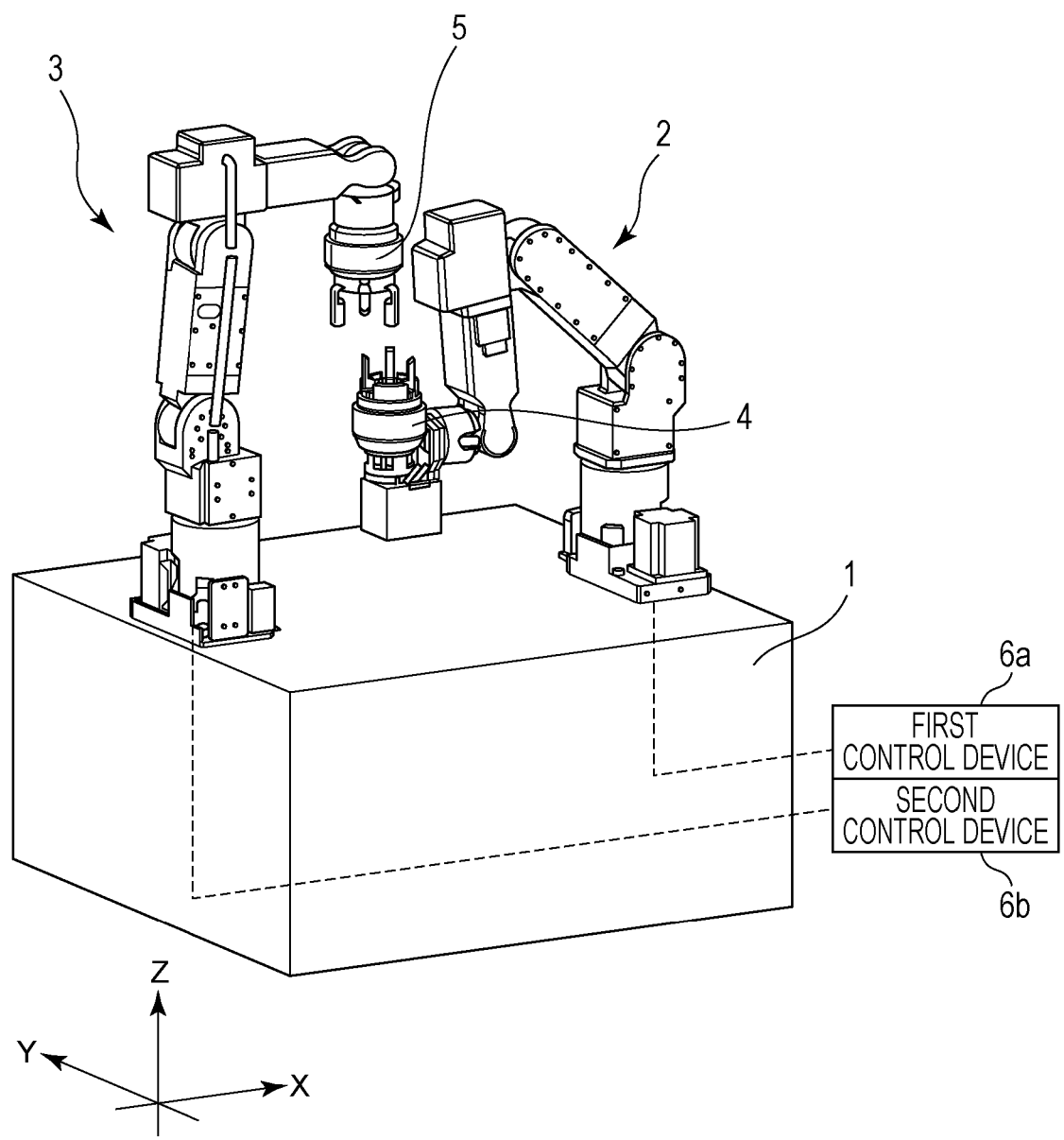
FIG. 1 illustrates assembly equipment according to a first embodiment.

FIG. 1 is a perspective view of assembly equipment according to a first embodiment. Referring to FIG. 1, a first robot arm 2 and a second robot arm 3 of a six-axis articulated type are arranged on a base 1 to oppose each other. At distal ends of the first robot arm 2 and the second robot arm 3, holding hands 4 and 5 are provided. Each of the holding hands 4 and 5 comprises an attachment having a force sensor mounted in a wrist portion of the robot arm and an aligning holding mechanism provided in a rotation mechanism. The force sensor can detect the force applied to the hand during assembly. The force sensor does not always need to be mounted, but can be mounted according to user's need.

Figure 2:
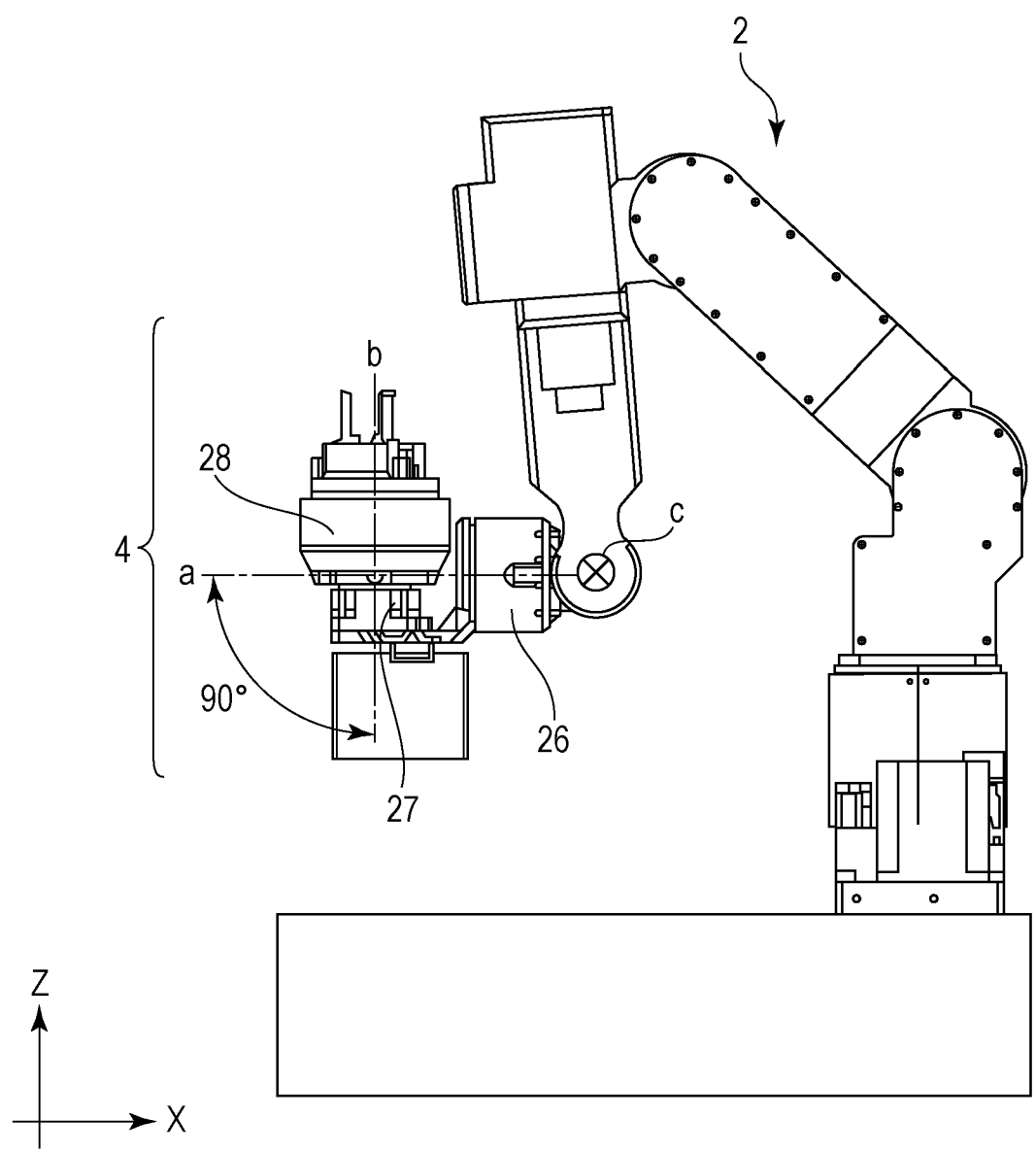
FIG. 2 illustrates a first holding hand according to the first embodiment.

FIG. 2 illustrates the first holding hand 4 in the first embodiment. As illustrated in FIG. 2, an attachment 26 comprises a mechanism that rotates about a rotation shaft a. The attachment 26 further comprises a rotation mechanism 27 having a rotation shaft b. The rotation shaft b intersects the rotation shaft a of the attachment 26. The rotation shaft b and the rotation shaft a may have a skewed positional relationship.

The term "skewed positional relationship" refers to a positional relationship between two straight lines in space that are not parallel and do not intersect each other.

A first control device 6a and a second control device 6b are connected to the robot arms. According to signals output from the control devices, the robot arms and the holding hands operate. That is, the control devices control the first and second robot arms 2 and 3 and the first and second holding hands 4 and 5. The robot arms may be controlled by one control device.

When the first or second holding hand is equipped with the force sensor, assembly operation is performed with reference to the magnitude of force detected by the force sensor.

The robot arms 2 and 3 are controlled by the control devices. According to signals output from the control devices, a position and a posture in a three-dimensional space of a finger coordinate system provided in the attachment 26 can be changed.

A description will be given of a case in which the rotation shaft a and the rotation shaft b are orthogonal to each other in the first embodiment.

The rotation mechanism 27 is equipped with an aligning holding mechanism 28 such that an aligning position of the aligning holding mechanism 28 coincides with the rotation shaft b of the rotation mechanism 27.

The rotation mechanism 27 is attached to the robot arm with the attachment 26 being disposed therebetween in a state in which the rotation shaft b of the rotation mechanism 27 and the rotation shaft a of the attachment 26 intersect with each other.

For this reason, an article held in the first holding hand 4 can be conveyed to an arbitrary position, for example, while being kept in a horizontal posture.

In general, a part to be supplied to the assembly equipment is stably placed on a parts supply pallet while its center of gravity is low. When the part is held in the second holding hand 5, it can be conveyed to the position of the first holding hand 4 serving as an assembly position without changing its posture, and this enhances assembly efficiency. When the rotation shaft a and the rotation shaft b are orthogonal, the constituent units of the assembly equipment can be easily laid out, and a control program is simplified.

When electric wiring of the aligning holding mechanism 28 is passed through a hollow shaft of the rotation mechanism 27 with a slip ring being disposed therebetween, the aligning holding mechanism 28 can be rotated without any limitation to the number of rotations of the rotation mechanism 27.

FIG. 2 illustrates the first holding hand 4. The first holding hand 4 can turn about a turn shaft c at a distal end of the first robot arm 2. Further, the aligning holding mechanism 28 can rotate about the rotation shaft a provided in the attachment 26.

In this way, the changes of the rotation angles of the rotation shaft a of the attachment 26 and the rotation shaft b of the rotation mechanism 27 relative to the first robot arm 2 are not used to change the position and posture of the first robot arm 2. For this reason, the posture of the aligning holding mechanism 28 can be controlled independently of the position and posture of the robot arm 2. Cooperative rotation of the rotation shaft a of the attachment 26 and the rotation shaft b of the rotation mechanism 27 according to a signal from the control device allows the aligning holding mechanism 28 to be moved in a free posture. Alternatively, the aligning holding mechanism 28 can be moved by changing the position and posture of the robot arm 2 while maintaining the posture of the aligning holding mechanism 28. Of course, when only one rotation shaft is needed to maintain the posture of the aligning holding mechanism 28, cooperative rotation is performed so that the change of the rotation angle of the other rotation shaft becomes zero.

Working areas of the first and second holding hands 4 and 5 provided in the robot arms 2 and 3 are arranged as follows. A working area $\alpha$ of the first holding hand 4 and a working area $\beta$ of the second holding hand 5 overlap to form an overlapping area. In this overlapping area, a cooperative working area is provided in which the first and second holding hands 4 and 5 of the two robot arms 2 and 3 perform assembly operation in cooperation with each other. Since a sufficient assembly operation is frequently difficult in boundary areas on the outermost sides of the working areas of the holding hands of the robots, the cooperative working area is frequently provided on an inner side of the overlapping area.

The working areas will be described in more detail in conjunction with a third embodiment with reference to the drawings.

Since the assembly equipment of the first embodiment has the above-described configuration, the number of joints of the robot arms can be reduced. Since this further simplifies the structure of the control system, the cost is reduced and the first holding hand 4 can be operated with high positioning accuracy. In this way, the number of shafts of the robot arms can be reduced. The technique of the present embodiment is also applicable to an articulated robot having seven or more axes and an articulated robot having less than six axes.

A holding portion of the aligning holding mechanism 28 comprises claws that has a shape such as to hold a plurality of kinds of annular articles from the outer side or the inner side depending on the use. The claws open and close in the same phase, and this allows a plurality of kinds of annular articles to be held in an aligned manner. A bearing surface for receiving a held article is provided below the claws. The bearing surface has a shape such as to suppress the tilt of the held article and to hold the article in a predetermined phase.

Second Embodiment

Figure 3:
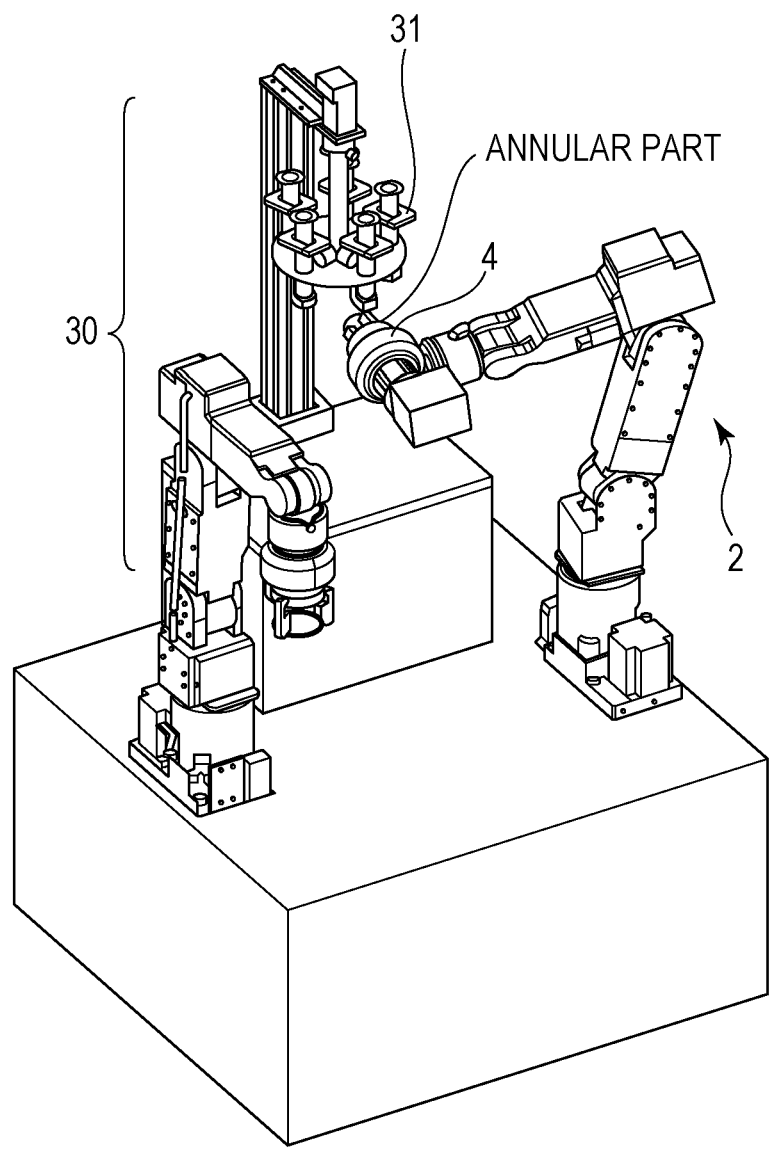
FIG. 3 illustrates assembly equipment according to a second embodiment.

FIG. 3 illustrates a second embodiment. Referring to FIG. 3, a working unit 30 is installed in the assembly equipment of the first embodiment. The working unit 30 performs a special assembly operation requested by the user, such as screwing and application of various coating materials. The working unit 30 comprises a working section 31 that performs assembly operation, for example, a screwdriver or a coating device.

Here, a detailed description will be given of a case in which the working unit 30 comprises a coating device for ejecting a coating material. Hereinafter, the working section 31 will be referred to as a coating device. The coating device stores various coating materials necessary for assembly such as adhesive, grease, and self-adhesive, and performs assembly while applying a predetermined amount of coating material onto a predetermined position of a part to be assembled.

First, the assembly equipment conveys an annular part, which is aligned and held by a first holding hand 4, to a predetermined position near the coating device in the working unit 30 so that the annular part takes a predetermined posture.

To coat the annular part in a circumferential direction, the coating device is started to eject a coating material, and simultaneously, a rotation mechanism 27 is rotated by a predetermined amount and at a predetermined speed.

In this way, in the second embodiment, the coating device is not moved, unlike the related art in which the coating device held in the second holding hand is moved onto the assembly stage for coating. Therefore, the gap amount between the coating device and the annular part and the coating angle can be easily maintained with a target positioning accuracy, and this increases coating accuracy.

In the related art, when an annular part is held on the assembly stage, it is sometimes physically difficult to coat an inner side of the annular part because the coating device has a number of blind spots. Since the working unit 30 including the working section 31 for performing assembly operation is set in the cooperative working area in the second embodiment, the posture of the annular part can be independently changed with a degree of freedom equivalent to that of the six-axis articulated robot.

That is, the posture of the coating device relative to the part is not changed, but the posture of the part relative to the coating device can be changed.

For this reason, a coating operation is performed during assembly with a higher degree of freedom and a higher accuracy than in the method of the related art.

By setting the working unit 30 in the cooperative working area of the first and second holding hands 4 and 5, the part held in the second holding hand 5 may be conveyed to a predetermined position in the working unit 30 in a predetermined posture, and may be assembled in cooperation with a positioning or working section.

While the coating operation has been given as an example in the second embodiment, in other operations, for example, in a screwing operation, the working section 31 can be replaced with a screwdriver device.

Third Embodiment

Figure 4:
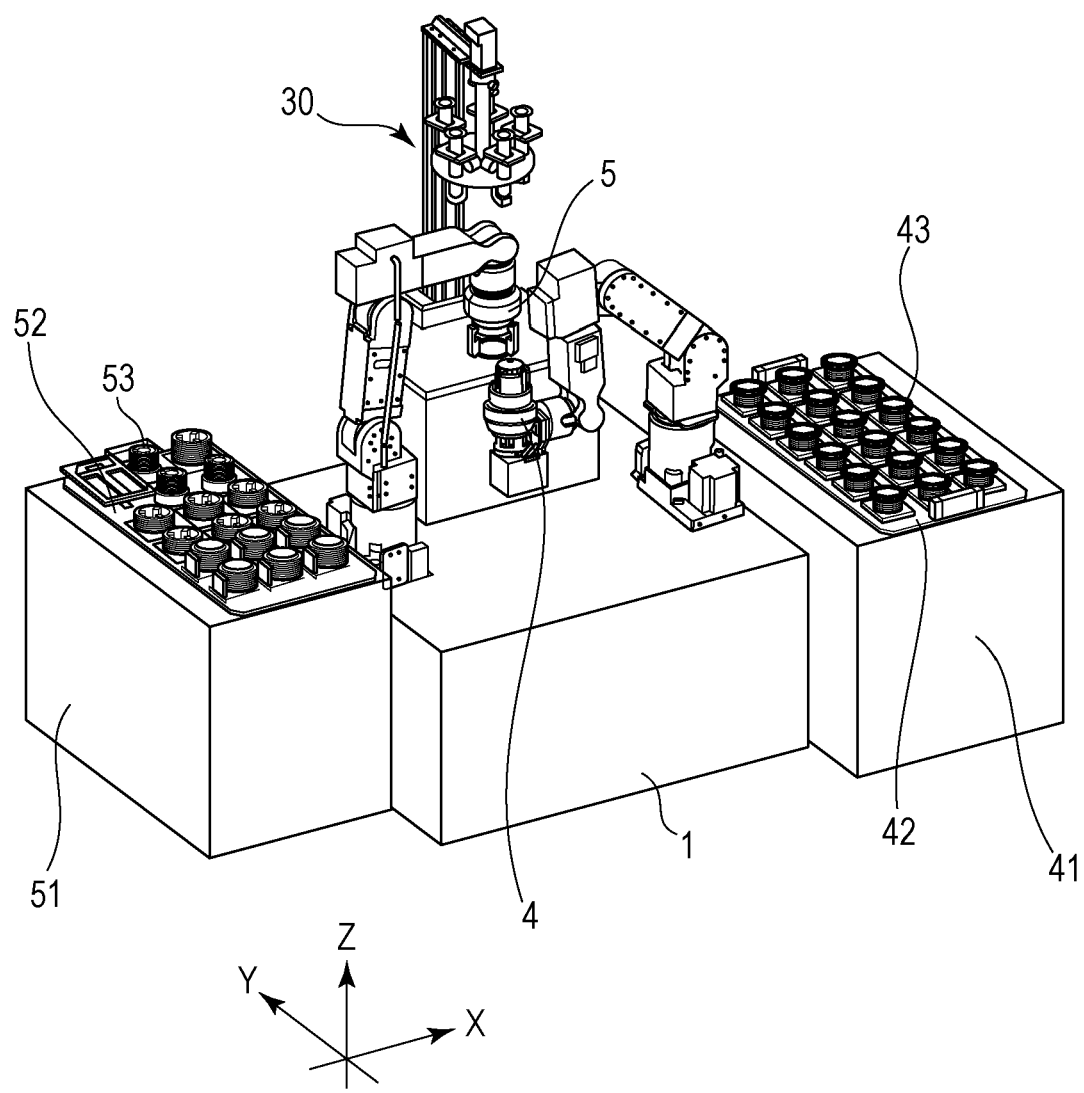
FIG. 4 illustrates assembly equipment according to a third embodiment.

FIG. 4 illustrates a third embodiment. Referring to FIG. 4, a workpiece supply pallet 42 is set on a workpiece supply table 41 in a working area of a first holding hand 4, and a plurality of annular workpieces 43 are placed on the workpiece supply pallet 42. Further, a parts supply pallet 52 is set on a parts supply table 51 in a working area of a second holding hand 5, and a plurality of sub-pallets are placed on the parts supply pallet 52. A plurality of annular parts 53 of one type are stacked on each of the sub-pallets.

Figure 6:
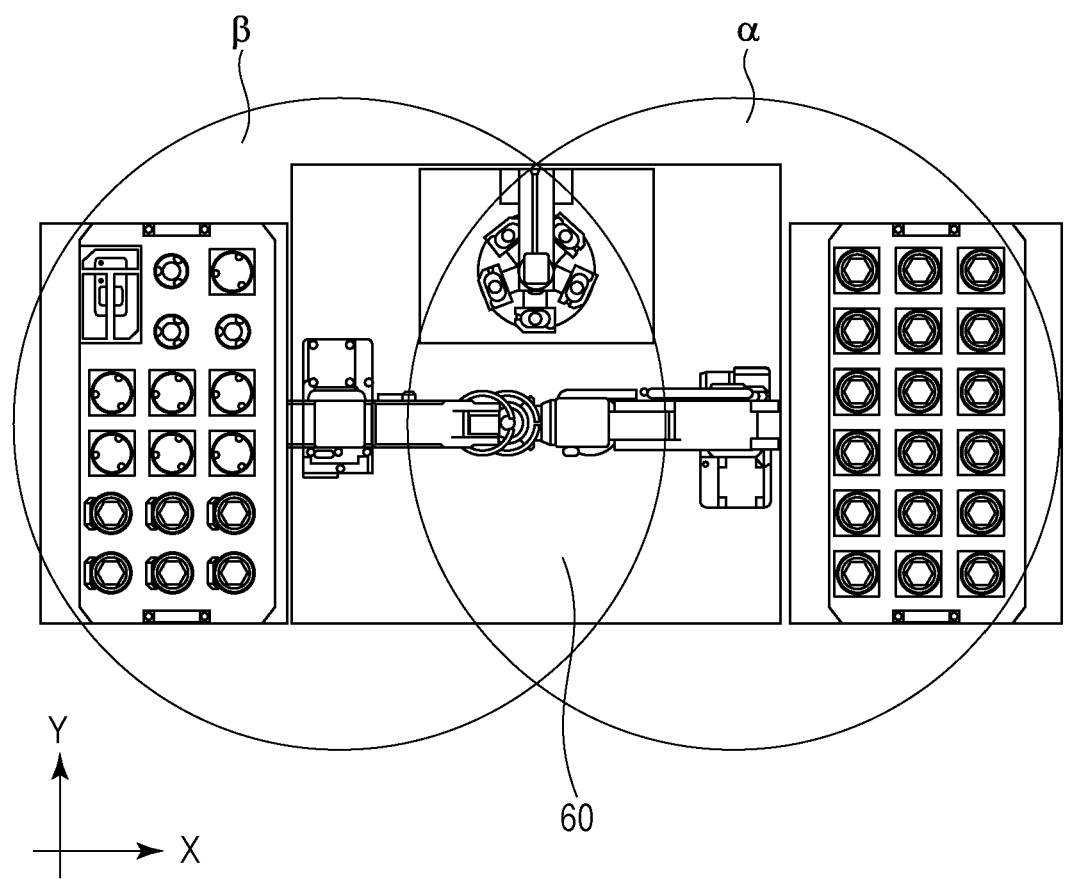
FIG. 6 illustrates working areas in the third embodiment.

FIG. 6 illustrates working areas of the holding hand 4 and 5 provided in robot arms according to the third embodiment. In an overlapping area of a working area α of the first holding hand 4 and a working area β of the second holding hand 5, a cooperative working area 60 where the two robot arms perform assembly in cooperation with each other is provided.

Operation performed in the third embodiment will be described in detail below.

Figure 5A:
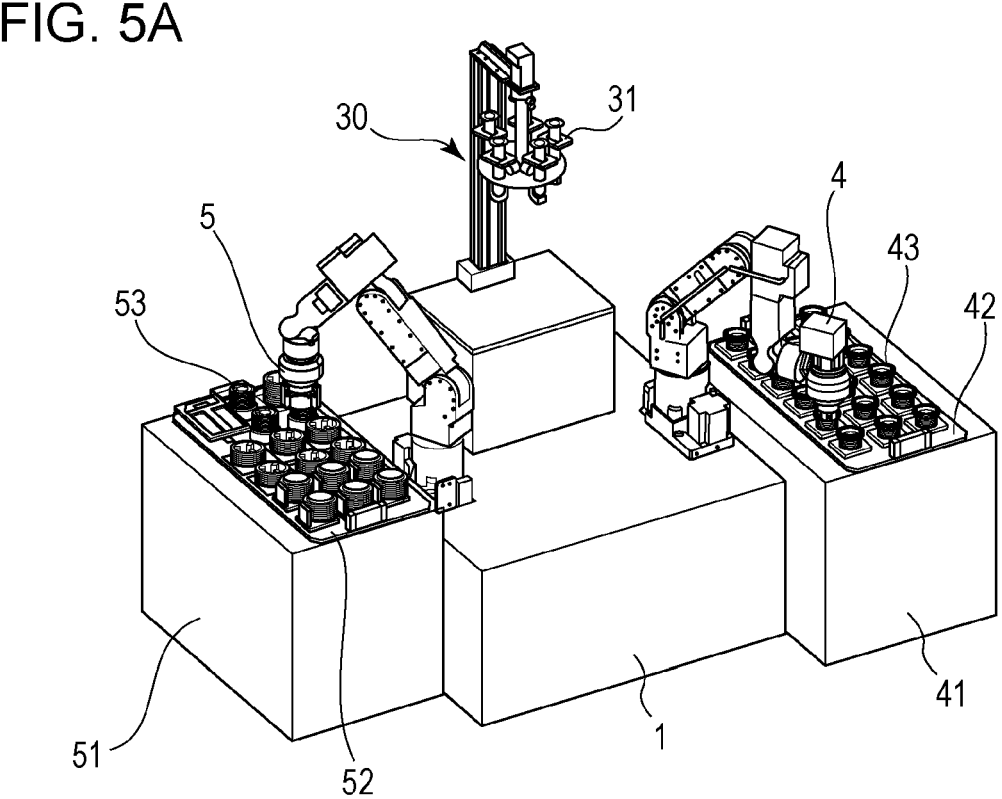
FIGS. 5A and 5B illustrate an exemplary operation in the third embodiment.

As illustrated in FIG. 5A, the first holding hand 4 aligns and holds an annular workpiece 43 on the workpiece supply pallet 42 from above. Then, the first holding hand 4 conveys the workpiece 43 to the cooperative working area 60 while changing the posture of the workpiece 43. In contrast, the second holding hand 5 approaches a part 53 in the parts supply pallet 52 on the parts supply table 51 from above, and aligns, holds, and conveys the part 53 to the cooperative working area 60. FIG. 4 illustrates states of two robot arms immediately before assembly. After that, the two robot arms perform assembly operation.

After the second holding hand 5 moves to the parts supply table 51 and holds and conveys the part 53 to the cooperative working area 60, it performs an assembly operation of assembling the part 53 to the annular workpiece 43. The parts supply pallet 52 stores a plurality of kinds of parts, and the second holding hand 5 sequentially conveys the parts for assembly.

The workpiece supply table 41 is provided outside the working area β of the second holding hand 5, and the parts supply table 51 is provided outside the working area α of the first holding hand 4. For this reason, there is no risk of interference of moving bodies, such as the holding hands and the robot arms, outside the overlapping working area 60 of the working area α and the working area β. Therefore, it is possible to simplify preparation for start of production activities for avoiding interference, such as improvement of layout, change of a program, and instructions to the robots. This shortens the start-up time of the production activities of the assembly equipment.

When the annular workpiece 43 is moved such that an assembled portion is located in a predetermined position and a predetermine posture (for example, the assembled portion is faced upward in the Z-direction for assembly) and the part 53 is moved by the second holding hand 5 from the parts supply table 51 to the cooperative working area 60, there is little need to change the posture of the part 53. For this reason, part conveyance can be performed efficiently.

The assembly equipment may further comprise a camera. In this case, the position and phase of the part are detected by processing an image of the part taken by the camera during conveyance from the parts supply table 51 to the cooperative working area 60, and the position and phase of the part are corrected to a predetermined position and a predetermined phase during conveyance to the cooperative working area 60. By thus carrying out the assembly operation on the basis of information about the taken image, for example, a more complicated fitting operation can be performed.

Figure 5B:
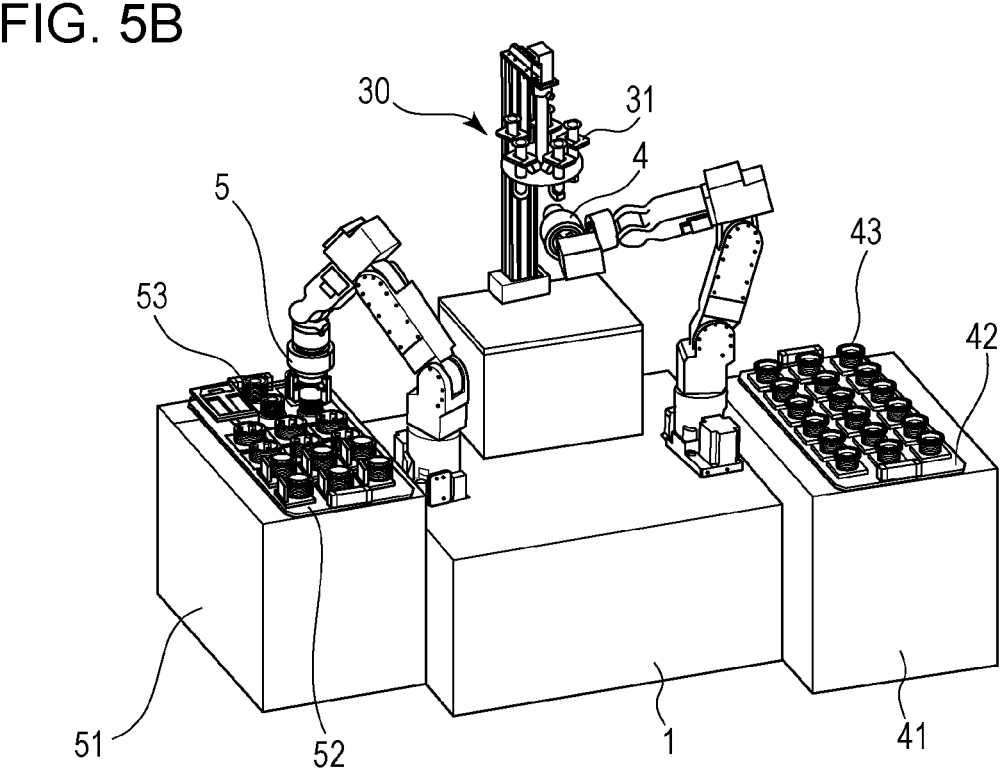

Further, as illustrated in FIG. 5B, while the second holding hand 5 is holding and conveying the next part, the first holding hand 4 can convey a workpiece to a predetermined position in the working unit 30 and perform assembly operation in cooperation with the working section 31.

Depending on the setups of the assembly operation, the second holding hand 5 can hold a part placed in the working area β thereof to carry out the above operation.

By thus successively assembling annular workpieces 43, efficient assembly is possible.

In these structures, there is no risk of interference of the holding hands and the robot arms outside the cooperative working area 60 illustrated in FIG. 6. Hence, it is not always necessary to control the two robot arms by one control device as in a dual-arm robot. For this reason, one control device and one robot arm can be combined when interlock is performed in the cooperative working area 60. In this case, for example, the program can be made simpler than in the typical dual-arm robot.

An unmanned automatic assembly equipment may be appropriately obtained by automatically supplying and ejecting the workpiece supply pallet 42 and the parts supply pallet 52 by an unmanned carrier such as an AGV.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-022075 filed Feb. 3, 2012, which is hereby incorporated by reference herein in its entirety.

What is claimed is:

1. Assembly equipment comprising:
   a base;
   a first holding hand provided in a first robot arm set on the base;
   a second holding hand provided in a second robot arm set on the base; and
   a control device configured to control the first and second robot arms and the first and second holding hands,
   wherein the first holding hand includes a first rotation unit that rotates about an axis of rotation A and a second rotation unit that rotates about an axis of rotation B,
   wherein the second rotation unit is attached to the first rotation unit, an aligning holding unit is attached to the second rotation unit, and the second rotation unit is disposed between the first rotation unit and the aligning holding unit,
   wherein the second rotation unit and the aligning holding unit rotate together with the first rotation unit about the axis of rotation A,
   wherein the aligning holding unit rotates together with the second rotation unit about the axis of rotation B,
   wherein the aligning holding unit and the second rotation unit are disposed at all time with a virtual line traversing therethrough, the virtual line being an extended line of the axis of rotation A, and
   wherein a cooperative working area of the first and second holding hands is provided in an overlapping area where working areas of the first and second holding hands overlap with each other.

2. The assembly equipment according to claim 1, wherein a working unit including a working section configured to perform assembly operation is set in the cooperative working area on the base.

3. The assembly equipment according to claim 1, wherein the axis of rotation A and the axis of rotation B rotate in cooperation to move the aligning holding mechanism while maintaining a posture of the aligning holding mechanism.

4. The assembly equipment according to claim 1, wherein a holding portion of the aligning holding mechanism comprises a plurality of claws and the plurality of claws open and close in a same phase.

5. The assembly equipment according to claim 4, wherein a bearing surface for receiving a held article is provided to the plurality of claws.

6. The assembly equipment according to claim 1, wherein the axis of rotation A and the axis of rotation B are substantially orthogonal to each other.

7. The assembly equipment according to claim 1, wherein the control device is provided for each of the first robot arm and the second robot arm.

8. The assembly equipment according to claim 1, wherein the first robot arm is a six-axis articulated robot arm.

9. The assembly equipment according to claim 1, further comprising:
   a first workpiece supply table configured to supply a part to be held by the first holding hand of the first robot arm, and
   a second workpiece supply table configured to supply a part to be held by the second holding hand of the second robot arm,
   wherein the first workpiece supply table is provided outside the working area of the second holding hand, and
   wherein the second workpiece supply table is provided outside the working area of the first holding hand.

10. The assembly equipment according to claim 1, wherein an aligning position of the aligning holding unit substantially coincides with the axis of rotation B of the second rotation unit.

11. The assembly equipment according to claim 1, wherein the first rotation unit includes a first portion and a second portion, the first portion has a plane intersecting with the axis A, and the second portion has a plane intersecting with the axis B.

12. The assembly equipment according to claim 11, wherein the second portion of the first rotation unit, the second rotation unit, and the aligning holding unit are in alignment of the axis B.

13. An assembly method that assembles an article, the method comprising:
   operating a first holding hand; and
   operating a second holding hand,
   wherein the first holding hand and the second holding hand are operated in cooperation in an overlapping area of working areas of the first and second holding hands,
   wherein the first holding hand includes a first rotation unit that rotates about an axis of rotation A and a second rotation unit that rotates about an axis of rotation B,
   wherein the second rotation unit is attached to the first rotation unit, an aligning holding unit is attached to the second rotation unit, and the second rotation unit is disposed between the first rotation unit and the aligning holding unit,
   wherein the second rotation unit and the aligning holding unit rotate together with the first rotation unit about the axis of rotation A,
   wherein the aliening holding unit rotates together with the second rotation unit about the axis of rotation B,
   wherein the aligning holding unit and the second rotation unit are disposed at all time with a virtual line traversing therethrough, the virtual line being an extended line of the axis of rotation A,
   wherein the second holding hand is connected to a second robot arm, and
   wherein the first robot arm and the second robot arm are arranged on a base such that the working areas of the first and second holding hands overlap with each other to form the overlapping area.

14. The assembly method according to claim 13, wherein the second holding hand holds a part and conveys the part to the first holding hand without changing a posture of the part, and the first holding hand and the second holding hand assemble the part.

15. The assembly method that assembles an article according to claim 13, wherein the first rotation unit includes a first portion and a second portion, the first portion has a plane intersecting with the axis A, and the second portion has a plane intersecting with the axis B.

16. The assembly method that assembles an article according to claim 15, wherein the second portion of the first rotation unit, the second rotation unit, and the aligning holding unit are in alignment of the axis B.

17. An assembly equipment comprising:
a base;
a holding hand provided in a robot arm set on the base; and
a control device configured to control the robot arm and the holding hand,
wherein the holding hand includes a first rotation unit that rotates about an axis of rotation A and a second rotation unit that rotates about an axis of rotation B,
wherein the second rotation unit is attached to the first rotation unit, an aligning holding unit is attached to the second rotation unit, and the second rotation unit is disposed between the first rotation unit and the aligning holding unit,
wherein the second rotation unit and the aligning holding unit rotate together with the first rotation unit about the axis of rotation A,
wherein the aligning holding unit rotates together with the second rotation unit about the axis of rotation B, and
wherein the aligning holding unit and the second rotation unit are disposed at all time with a virtual line traversing therethrough, the virtual line being an extended line of the axis of rotation A.

18. The assembly equipment according to claim 17, further comprising a working unit including a working section configured to perform assembly operation sets in the cooperative working area on the base.

19. The assembly equipment according to claim 17, wherein the axis of rotation A and the axis of rotation B rotate in cooperation to move the aligning holding mechanism while maintaining a posture of the aligning holding mechanism.

20. The assembly equipment according to claim 17, wherein a holding portion of the aligning holding mechanism comprises a plurality of claws and the plurality of claws open and close in a same phase.

21. The assembly equipment according to claim 17, wherein the axis of rotation A and the axis of rotation B are substantially orthogonal to each other.

22. The assembly equipment according to claim 17, wherein the control device is provided for each of the robot arm.

23. The assembly equipment according to claim 17, wherein the robot arm is a six-axis articulated robot arm.

24. The assembly equipment according to claim 17, further comprising a workpiece supply table configured to supply a part to be held by the holding hand of the robot arm.

25. The assembly equipment according to claim 17, wherein the first rotation unit includes a first portion and a second portion, the first portion has a plane intersecting with the axis A, and the second portion has a plane intersecting with the axis B.

26. The assembly equipment according to claim 25, wherein the second portion of the first rotation unit, the second rotation unit, and the aligning holding unit are in alignment of the axis B.

27. A holding hand comprises:
a first rotation unit that rotates about an axis of rotation A; and
a second rotation unit that rotates about an axis of rotation B,
wherein the second rotation unit is attached to the first rotation unit, an aligning holding unit is attached to the second rotation unit, and the second rotation unit is disposed between the first rotation unit and the aligning holding unit,
wherein the second rotation unit and the aligning holding unit rotate together with the first rotation unit about the axis of rotation A,
wherein the aligning holding unit rotates together with the second rotation unit about the axis of rotation B, and
wherein the aligning holding unit and the second rotation unit are disposed at all time with a virtual line traversing therethrough, the virtual line being an extended line of the axis of rotation A.

28. The holding hand according to claim 27, wherein the first rotation unit includes a first portion and a second portion, the first portion has a plane intersecting with the axis A, and the second portion has a plane intersecting with the axis B.

29. The holding hand according to claim 28, wherein the second portion of the first rotation unit, the second rotation unit, and the aligning holding unit are in alignment of the axis B.

30. Assembly equipment comprising:
a base;
a first holding hand provided in a first robot arm set on the base;
a second holding hand provided in a second robot arm set on the base; and
a control device configured to control the first and second robot arms and the first and second holding hands,
wherein the first holding hand includes a first rotation unit that rotates about an axis of rotation A and a second rotation unit that rotates about an axis of rotation B,
wherein the second rotation unit is attached to the first rotation unit, an aligning holding unit is attached to the second rotation unit, and the second rotation unit is disposed between the first rotation unit and the aligning holding unit,
wherein the second rotation unit and the aligning holding unit rotate together with the first rotation unit about the axis of rotation A,
wherein the aligning holding unit rotates together with the second rotation unit about the axis of rotation B,
wherein the axis of rotation A and the axis of rotation B are substantially orthogonal to each other,
wherein the aligning holding unit and the second rotation unit are disposed with a virtual line traversing therethrough, the virtual line being an extended line of the axis of rotation A, and
wherein a cooperative working area of the first and second holding hands is provided in an overlapping area where working areas of the first and second holding hands overlap with each other.

* * * * *